US009256447B2

(12) United States Patent
Gujarathi et al.

(10) Patent No.: US 9,256,447 B2
(45) Date of Patent: Feb. 9, 2016

(54) INTEGRATED APPLICATION LAUNCHING IN HETEROGENEOUS CLOUD COMPUTING ENVIRONMENT

(75) Inventors: Ashish Gujarathi, Coral Springs, FL (US); Michael East, Deerfield Beach, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 191 days.

(21) Appl. No.: 13/588,152

(22) Filed: Aug. 17, 2012

(65) Prior Publication Data

US 2013/0104044 A1   Apr. 25, 2013

Related U.S. Application Data

(60) Provisional application No. 61/551,390, filed on Oct. 25, 2011.

(51) Int. Cl.
*G06F 3/048* (2013.01)
*G06F 9/44* (2006.01)
*G06F 3/0481* (2013.01)
*G09G 5/14* (2006.01)

(52) U.S. Cl.
CPC ............ *G06F 9/4445* (2013.01); *G06F 3/0481* (2013.01); *G09G 5/14* (2013.01)

(58) Field of Classification Search
CPC ........ G06F 9/4445; G06F 3/0481; G09G 5/14
USPC .......... 715/778, 740, 733, 744; 709/202, 239, 709/203, 231
See application file for complete search history.

(56) References Cited

U.S. PATENT DOCUMENTS

| 7,725,527 | B2* | 5/2010 | Janssen et al. ................ 709/203 |
| 7,890,570 | B2* | 2/2011 | Mazzaferri .................... 709/202 |
| 2002/0188672 | A1* | 12/2002 | Janssen et al. ................ 709/203 |
| 2005/0125560 | A1* | 6/2005 | Brockway et al. ............ 709/249 |
| 2007/0088556 | A1* | 4/2007 | Andrew ..................... 704/270.1 |
| 2008/0244107 | A1* | 10/2008 | Uno ................................ 710/15 |
| 2009/0070405 | A1* | 3/2009 | Mazzaferri .................... 709/202 |
| 2009/0235342 | A1* | 9/2009 | Manion et al. .................... 726/7 |

(Continued)

OTHER PUBLICATIONS

"Customize the Start menu." Microsoft, Archived Jul. 5, 2009. Web. Feb. 26, 2014. http://windows.microsoft.com/en-us/windows7/customize-the-start-menu.*

(Continued)

*Primary Examiner* — Jennifer To
*Assistant Examiner* — John Repsher, III
(74) *Attorney, Agent, or Firm* — BainwoodHuang

(57) ABSTRACT

Application programs delivered from one or more cloud computing systems ("clouds" or "CCSs") are integrated into a desktop being delivered/hosted by another cloud ("primary" CCS). In one respect, the integration includes integration of controls for directly launching a separately hosted application program from a desktop hosted by the primary CCS, such as by selection of a start menu entry or activation of a "shortcut" icon that points to the application program. In another respect, a separately hosted application program is launched based on a user opening or accessing content (e.g. data file) that is specifically associated with the separately hosted application program but residing more locally, such as in the hosted desktop. In this aspect, the content is seamlessly redirected to the other cloud without requiring any direct network connectivity between the clouds.

14 Claims, 7 Drawing Sheets

(56) References Cited

U.S. PATENT DOCUMENTS

| | | | |
|---|---|---|---|
| 2009/0313321 A1* | 12/2009 | Parsons et al. | 709/203 |
| 2011/0138016 A1* | 6/2011 | Jung et al. | 709/219 |
| 2011/0271226 A1* | 11/2011 | Janssen et al. | 715/794 |
| 2012/0005269 A1* | 1/2012 | Janssen et al. | 709/203 |
| 2012/0150785 A1* | 6/2012 | Subramanya | 706/46 |
| 2012/0311457 A1* | 12/2012 | O'Gorman | 715/740 |
| 2014/0012714 A1* | 1/2014 | Feldman et al. | 705/27.1 |

OTHER PUBLICATIONS

"Terminal Services Web Access (TS Web Access)." Microsoft, Jan. 10, 2008. Web. Feb. 26, 2014. http://technet.microsoft.com/en-us/library/cc771908(v=ws.10).aspx.*

Virtual Desktop Extender, From Wikipedia, the free encyclopedia, http://en.wikipedia.org/w/index.php?title=Virtual_Desktop_Extender&oldid=427110911 Jan. 8, 2013, 2 pages.

* cited by examiner

INTEGRATED APPLICATION LAUNCHING IN HETEROGENEOUS CLOUD COMPUTING ENVIRONMENT

BACKGROUND

The invention is related to the field of remotely hosted computing, commonly referred to in the information technology industry as "cloud computing".

SUMMARY

A primary cloud computing system (CCS) provides a cloud-hosted desktop, in some embodiments employing software known by the name Citrix XenApp™ or Citrix XenDesktop™ A cloud-hosted desktop typically includes off-the-shelf application programs like Microsoft Office®, Adobe Reader® etc. However, there may be other application programs that are not offered by the primary CCS. There may be a variety of reasons as follows:

1. The application program may be a specialized line-of-business application program that a service provider operating the primary CCS doesn't want to provide (e.g., it may be very specialized and used by few customers).

2. The customer wants to host the application program in their own datacenter for some reason, such as security/compliance.

3. The application program is only available from a separate source, such as an organization that developed the application program and offers it as a service. In this case, the application may be delivered by a separate CCS (may be referred to as a secondary CCS).

Thus in some situations, a desktop is being delivered from one cloud, and application programs are being delivered from other clouds (i.e., an in-premise cloud, or a cloud operated by an Internet service provider (ISV cloud). When the user is accessing the cloud-hosted desktop, the user needs a way to access such separately delivered (or "separately hosted") application programs, preferably in a manner seamlessly integrated into the cloud-hosted desktop. This way the user can access a wider variety of computing resources from one hosted desktop provided by a primary CCS, even resources that are made available to the user by a different computing system such as a secondary CCS. The user is not burdened with maintaining and switching between different interfaces to different systems to access desired resources.

In general, the present disclosure is directed to techniques for integrating application programs being delivered from one or more cloud computing systems ("clouds" or "CCSs") into a desktop being delivered/hosted by another cloud. Two separate aspects are described. One is the integration of controls for directly launching a separately hosted application program from a desktop hosted by a primary CCS, such as by selection of an entry in a start menu or activation of a "shortcut" icon that points to the application program. Another aspect is the desire to indirectly launch such a separately hosted application program based on a user opening or accessing content (e.g. data file) that is specifically associated with the separately hosted application program but residing more locally, such as in the hosted desktop. In this aspect, the challenge includes seamlessly redirecting the content to the other cloud without requiring any direct network connectivity between the clouds. As an example, a user may receive a file as an attachment in an e-mail program running in the cloud-hosted desktop, while the application program needed to open the content is hosted in a separate cloud. This kind of task is enabled by the presently disclosed techniques.

Generally, the disclosed techniques provide a way to integrate application programs from multiple clouds (public or private) without certain performance and other issues associated with known approaches and providing a seamless user experience.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The entire disclosure of U.S. Provisional Application 61/551,390 filed Oct. 25, 2011 is incorporated by reference herein.

Figure 1:
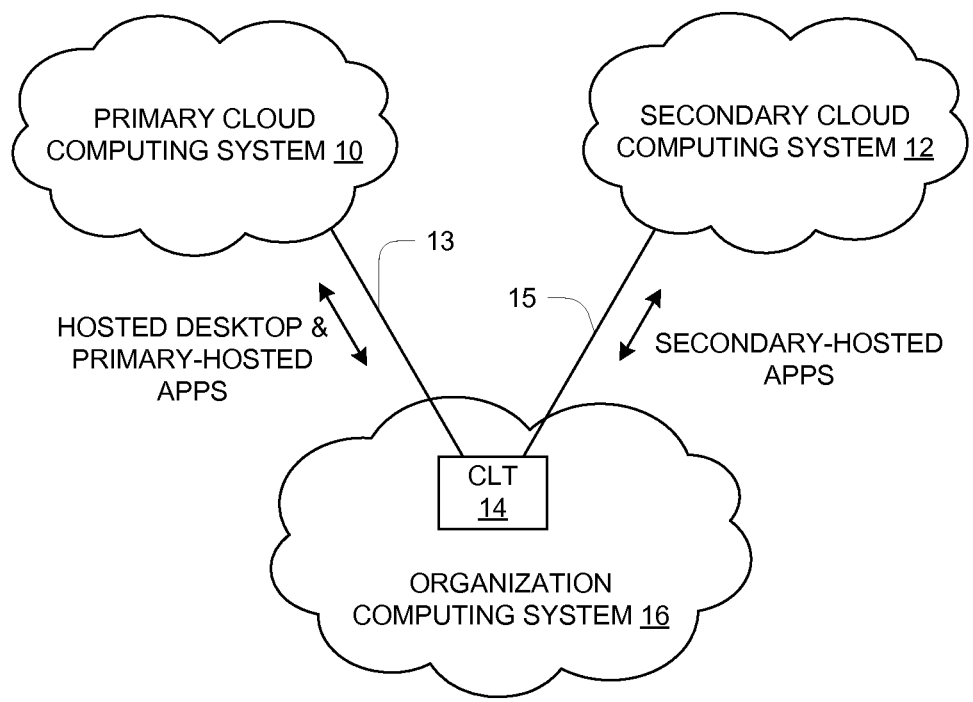
FIG. 1 is a block diagram of a heterogeneous cloud computing system having separate cloud computing systems providing application services to a client computer.

FIG. 1 shows a computing environment including a primary cloud computing system (primary CCS) 10 and a secondary cloud computing system (secondary CCS) 12, along with a client computer (CLT) 14 operating in an organization computing system 16. As shown, the primary CCS 10 has a functional connection 13 to the client computer 14 over which the primary CCS 10 provides computing services including a hosted desktop user interface ("hosted desktop") and (optionally) one or more primary-hosted application programs ("apps") to the client computer 14. The secondary CCS 12 has a functional connection 15 to the client computer 14 over which it provides computing services including one or more secondary-hosted application programs to the client computer 14. The application programs from the primary CCS 10 and secondary CCS 12 are provided as application services, meaning that they are executed at the respective system 10, 12 on behalf of and under control of the client computer 14, typically including user input/output via one or more windows or similar user interfaces displayed at the client computer 14.

The primary CCS 10, secondary CCS 12, and organization computing system 14 are all generally realized as networked computer systems having computers and other hardware resources interconnected by computer network connections. In a typical case the computers include so-called "server" computers each having memory, computer program instruction processing circuitry, and input/output circuitry for interfacing the server computer to one or more networks, to local storage devices, and to other peripheral devices or systems. Other hardware resources can include network-attached storage systems and other specialized systems and components. The computers execute computer program instructions that cause the computers to perform methods or functions as generally known in the art. The description herein is primarily at a functional level, and it will be understood that the functions are realized by the computers and other hardware resources executing corresponding sets of computer instructions referred to as "programs", "routines", etc. as generally known.

The organization computing system 16 may be organized in a conventional manner to include both user-associated "client" computers as well as sets of server computers, which may be physically located in one or more datacenters for example. The primary and secondary cloud computing systems 10, 12 are distinguished as such by virtue of their ability to provide computing services to external clients (such as client 14) without exposing underlying low-level details about the specific hardware or software structure and organization. A client 14 can be configured with minimal information to enable it to obtain a desired service from either the primary or secondary CCS 10, 12, leaving the details of much of the underlying structure and functionality to software tailored for the purpose. As an example, from a user perspective a hosted desktop may be accessed by clicking on an icon, and it appears and functions in the same way as a local desktop presented by a user's personal computer (PC), for example. The user relies on hosting and virtualization software to provide the underlying functions and interactions that achieve this operation.

The term "desktop" herein refers to functionality typically provided by a personal computer operating system such as Windows®, Unix® or Mac OS®, including a graphical user interface employing the "desktop" paradigm in which items (icons, windows) are arrayed on a background. Typically the desktop interface also includes system-level control regions such as task bars, docks, menu bars, etc., with these regions including user-activatable controls such as icons, menus, etc. A "hosted desktop" is a desktop provided to a client computer 14 by another computer, typically a server that is said to "host" the desktop. This can be seen as a type of virtual PC executing in the server computer and presenting its graphical user interface to a separate real PC or other client machine. Known software of this type is sold under the names XenApp™ and XenDesktop™ by Citrix Systems, Inc.

The terms "primary" and "secondary" with respect to the CCSs 10, 12 are used as convenient labels for a specific purpose, which is to identify the primary CCS 10 as that which provides the hosted desktop to the client computer 14. No other meanings are intended. This distinction is necessary for the description of the system and its functionality presented below. Additionally, while in the description below the secondary CCS 12 provides a "separately hosted" application program that is to be integrated into the hosted desktop, in general the separately hosted application program need not be provided by a separate CCS or even by a cloudlike system. For example, it may be provided by the organization computing system 16, presumably in a server or other computer separate from the client computer 14.

Figure 2:
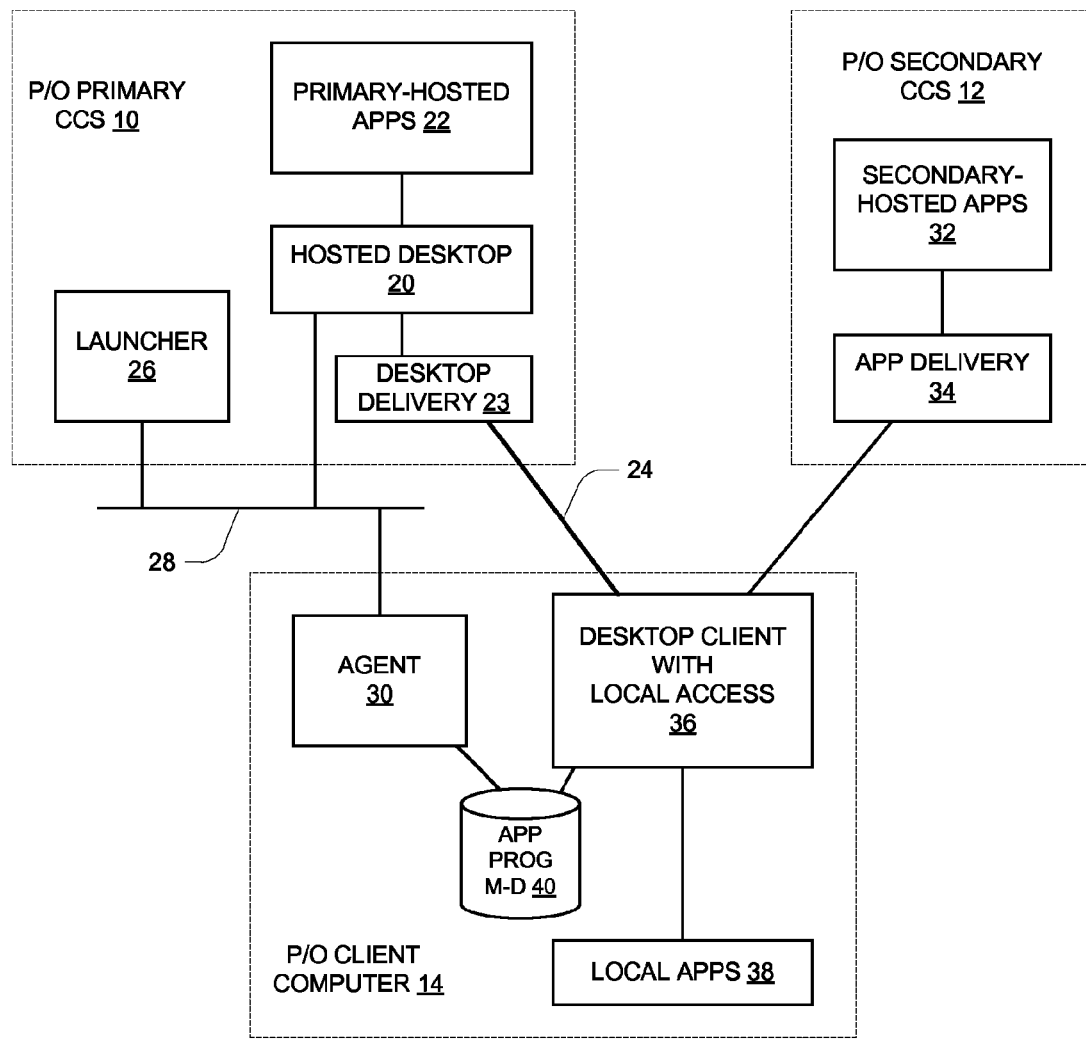
FIG. 2 is a block diagram showing more detail of components of the cloud computing system.

FIG. 2 shows portions of the computing systems 10, 12 and 16 and their interconnection in pertinent detail. The primary CCS 10 includes a desktop hosting program shown as a hosted desktop 20, and optionally one or more primary-hosted application programs (apps) 22. Also included is a desktop delivery program 23 that "delivers" the functionality of the primary-hosted application program(s) 22 and hosted desktop 20 to the client computer 14 as though they were being executed locally by the client computer 14. One example of a desktop delivery program 23 is software known as Citrix XenApp™. The primary CCS 10 has a hosted desktop interface 24 to the client computer 14 over which the hosted desktop functionality is provided. The primary CCS 10 also includes a launcher 26 that provides functions of starting execution of ("launching") application programs.

Both the hosted desktop 20 and launcher 26 are connected to a control channel 28 to which an agent 30 of the client computer 14 is also connected. The agent 30 also communicates with the desktop delivery program 23 and application delivery program 34 by other connections not shown in FIG. 2.

The secondary CCS 12 includes one or more secondary-hosted application programs 32 and a hosted application delivery program 34 that delivers the functionality of the secondary-hosted application program(s) 32 to the client computer 14 as though they were being executed locally by the client computer 14. One example of a hosted application delivery program 34 is the above-referenced Citrix XenApp™ software. A secondary-hosted application program 32 is also referred to as a "separately" hosted application program herein, referring to the fact that it is hosted outside the hosted desktop 20.

The client computer 14 includes hosted-desktop client software (Desktop Client) 36 connected to the application delivery program 34 of the secondary CCS 12 as well as to the hosted desktop 20 via the hosted desktop interface 24. The desktop client 36 includes functionality referred to as "local access" that enables local client resources to be accessible in the hosted desktop 20. In one embodiment this local access functionality may be in the form of so-called "reverse seamless" or "virtual desktop extender" software. The client computer 14 may also include locally installed applications (apps) 38. The client computer also includes some form of storage for data referred to as "application program metadata" (App Prog M-D) 40 that contains information about application programs used by the client computer, as described in more detail below. The application program metadata 40 is accessible by the desktop client 36 as well as the agent 30.

Figure 3:
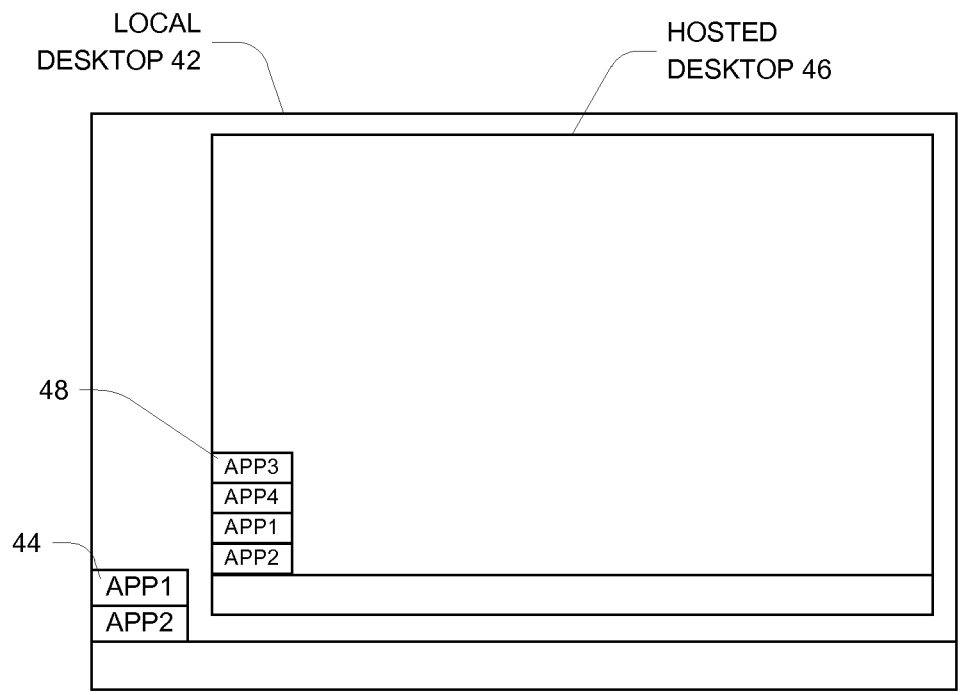
FIGS. 3 and 4 are depictions of window-type graphical user interface displays.
Figure 4:
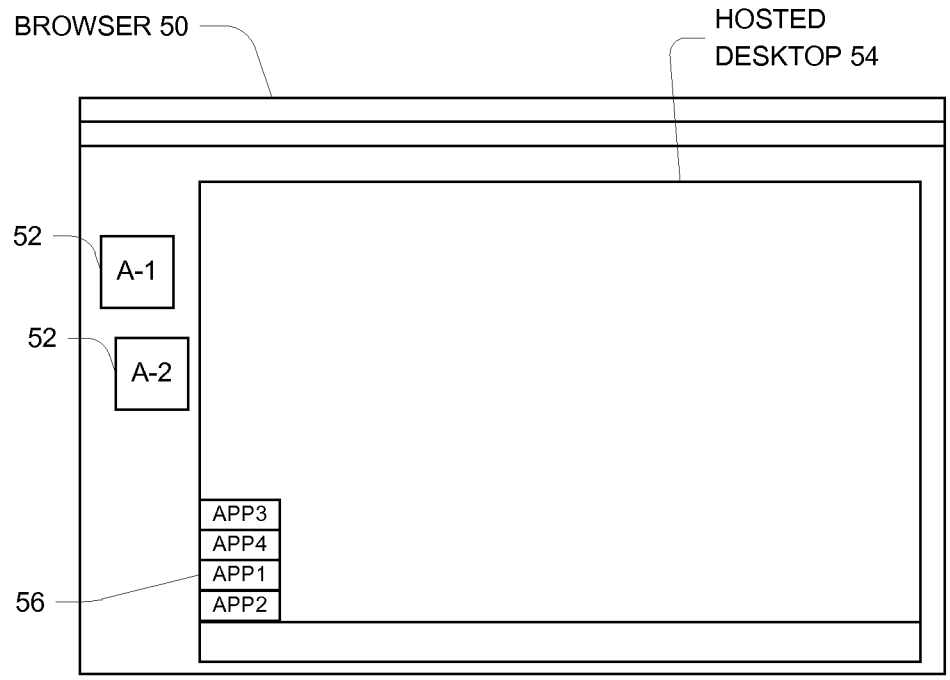

FIGS. 3 and 4 depict computer screen displays for two distinct types of client computers 14. FIG. 3 is a display for a so-called "fat" or "thick" client, which is a client computer 14 having substantial computing resources (memory, processing capability, etc.) and typically a complex, robust operating system capable of supporting a variety of intensive computing tasks. A good example of a fat client computer 14 is a personal computer. FIG. 4 is a display for a so-called "thin" client, which is a client computer 14 usually having more limited computing resources used primarily to provide a graphical user interface to access external computing resources (such as those of a separate server computer). The graphical user interface may be provided, for example, in the form of one or more browser-type windows that display hypertext pages served by external server computers. More detail is provided below.

Referring to FIG. 3, the fat client computer 14 provides a user interface in the form of a local desktop 42 having a background and control areas as described above. In particular, FIG. 3 shows a start menu 44 included in the local desktop 42. The start menu 44 presents a listing of one or more application programs (shown as APP1 and APP2) that are installed on the client computer 14 (i.e., locally installed applications 38 of FIG. 2) or otherwise executable by the client computer via the local desktop 42. In the present context, the start menu 44 includes one or more entries for the secondary-hosted application program(s) 32 hosted by the secondary CCS 12. This functionality of integrating application programs of the secondary CCS 12 into the local desktop 42 is provided in part by the application delivery program 34 in concert with the local desktop 42.

In the present description, the term "application program metadata" is used to refer to the name, appearance, location and other information about an application program. The entry for an application program in the start menu 44 forms part of the application program metadata for that application program. Also included is underlying information, normally not visible in the user interface, such as the path or location in the file system of the executable image of the application program. Application program metadata may also be included in items referred to as "shortcuts", which include graphical icons that can be placed on the background of the local desktop 42. An application program can be executed or "launched" by user selection of the application program name from the start menu 44 and/or user activation of a shortcut icon. It will be appreciated that the start menu 44s an example of an application-launching interface that is integral to the local desktop 42.

Returning to FIG. 3, also shown is a window ("hosted desktop") 46 which is the local presentation of the hosted desktop 20 from the primary CCS 10. Like the local desktop 42, the hosted desktop 46 has a background and a control area, including its own start menu 48 which is an integral application-launching interface. The items in start menu 48 are those configured in the hosted desktop 20, which may include for example entries for the primary-hosted application programs 22. Examples of these items are shown as APP3 and APP4. As shown, the start menu 48 also includes the same entries APP1 and APP2 that appear in the local desktop start menu 44. Thus the user of the client computer 14 has the ability to work entirely within the environment of the hosted desktop 20 (via window 46) while also being able to access application programs that are provided from outside that environment. In particular, as described in more detail below, the user is able to access the secondary-hosted application program(s) 32 provided by the secondary CCS 12. While in FIG. 3 this functionality is shown vis-à-vis the start menus 44 and 48, it may also be provided using shortcut icons on the respective desktops 42, 46 or more generally anywhere in an underlying directory or folder structure. Additionally, as described in more detail below, this functionality can be extended to enable a separately-hosted application program to be invoked by opening a data file for which an association with the separately-hosted application program has been established.

Referring to FIG. 4, the thin client computer 14 provides a user interface in the form of a window or frame 50 of a browser or similar terminal-like user interface program, where "terminal-like" refers to a primary or exclusive capability for user interface functions (graphical display, user input etc.) on behalf of a separate computer that executes a virtualized computer instance and/or application programs. In particular, FIG. 4 shows a pair of icons or other application-launching controls 52 included in the browser window 50. In this case, the controls 52 are for one or more application programs (identified as A-1 and A-2) that are executable by a separate server on behalf of this thin client 14. Similar to the fat client, the controls 52 include one or more controls for the secondary-hosted application program(s) 32 hosted by the secondary CCS 12. The functionality of integrating application programs of the secondary CCS 12 into the browser 50 is provided in part by the application delivery program 34 in concert with browser 50.

FIG. 4 also shows a window ("hosted desktop") 54 which is the local presentation of the hosted desktop 20 from the primary CCS 10. The hosted desktop 54 has a background and a control area, including its own start menu 56. The items in start menu 56 are those configured in the hosted desktop 20, which may include for example entries for the primary-hosted application programs 22. Examples of these items are shown as APP3 and APP4. As shown, the start menu 56 also includes entries APP1 and APP2 which correspond to the controls 52 for A-1 and A-2 that appear in the browser window 50. Thus the user of the client computer 14 has the ability to work entirely within the environment of the hosted desktop 20 (via window 54) while also being able to access application programs that are provided from outside that environment. In particular, as described in more detail below, the user is able to access the secondary-hosted application program(s) 32 provided by the secondary CCS 12. Additionally, as described in more detail below, this functionality can be extended to enable a separately-hosted application program to be invoked by opening a data file for which an association with the separately-hosted application program has been established.

Figure 5:
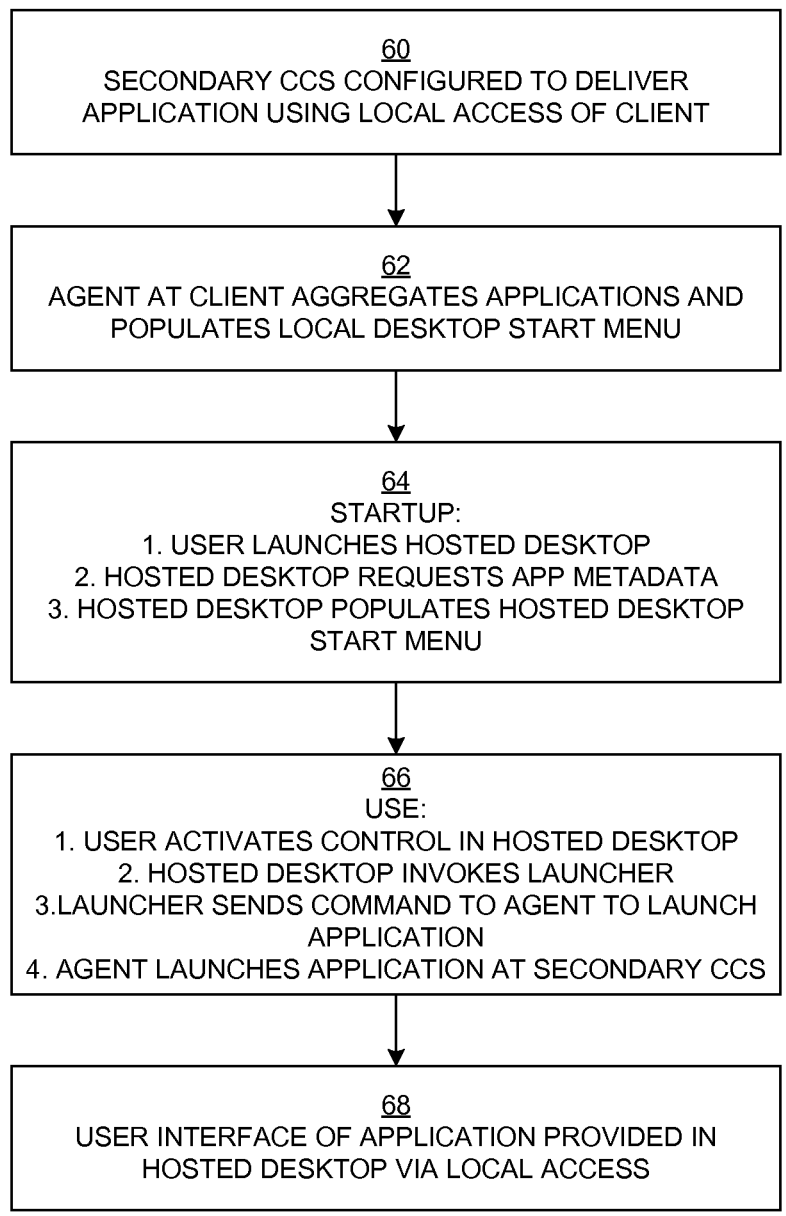
FIGS. 5-8 are flow diagrams depicting system functionality.

FIG. 5 is a flow chart describing a first aspect of operation of the system of FIGS. 1-2, in particular for the case of a fat client as described with reference to FIG. 3. At 60, the secondary CCS 12 is configured to deliver a secondary-hosted application program 32 to the client computer, meaning that the application program 32 is executed at the secondary CCS 12 on behalf of and under the control of the client computer 14. As described above, this configuration includes use of the application delivery program 34.

For description purposes, an example will be referred to in which the secondary-hosted application program 32 is a specialized program such as AutoCad®, a well known design automation program. It is assumed that the user of the client computer 14 has need for the hosted desktop 20 from the primary CCS 10, but also has need to run an application program such as AutoCad that is not available in the primary CCS 10. As mentioned above, one major purpose of the presently disclosed technique is to enable such a user to work within his/her hosted desktop environment and still be able to access such separately-hosted application programs (i.e., those hosted or otherwise provided outside of the hosted desktop environment of the primary CCS 10).

Referring again to FIG. 5, at 62 the agent 30 at the client computer 14 collects or "aggregates" information about application programs available to the client computer 14 and uses the information to populate the start menu 44 of the fat client. In one embodiment, the agent 30 may be realized using software known by the name Citrix Receiver™, which has a formal user interface and employs a user login to associate cloud computing resources with the user of the client computer 14. In general, the agent 30 is in communication with some or all cloud computing systems used by the client computer 14 and can obtain information about the application programs that are hosted thereby. These include the delivery programs 23, 34 of the primary CCS 10 and secondary CCS 12 respectively. Aggregation of the application program information may be by a variety of methods including a web interface or installed services. The application information, which forms part of application program metadata as discussed above, is used to create entries for the Start Menu, shortcut icons, etc. in the user's local desktop 42. It should be noted that the user's local desktop 42 will also include a control for launching the hosted desktop 20 at the primary CCS 10.

At 64 there is a startup phase of operation begun when the user launches the hosted desktop 20. Once the hosted desktop 20 is launched, as part of the startup process, the hosted desktop 20 sends a message over the control channel 28 to fetch the application program metadata as aggregated by the agent 30. Upon receiving the application program metadata, the hosted desktop 20 uses it to populate the hosted desktop window 46 with corresponding controls, such as entries in the hosted desktop start menu 48, shortcuts, etc. These items may appear along with information identifying where the programs are hosted, e.g., "AutoCad on secondary CCS", to help keep the user oriented.

At 66 is a use phase, which may start when a user at the client computer 14 activates a control for the application program (such as selecting a start menu entry or clicking on a shortcut icon on the hosted desktop 20). When this occurs, the hosted desktop 20 invokes the launcher 26 with information (such as a path specification) for the separately hosted application program 32, and the launcher 26 sends a command to the client computer 14 over the control channel 28 instructing the agent 30 to launch the application program from the client computer 14. The agent 30 does so, in communication with both the desktop client 36 and the application delivery program 34 of the secondary CCS 12. It should be noted that the application program may be delivered by the secondary CCS 12 in either a streamed or hosted manner.

At 68, the user interface functions of the application program are provided in the hosted desktop window 46. For example, if the application program generates a window or accepts user input, the window will appear in the hosted desktop window 46 and input will be accepted from an input device (keyboard, mouse) when that window has the input device focus. This functionality is provided by the local access functionality of the desktop client 36 in conjunction with the hosted desktop 20.

Referring back to the aggregating of application programs at 62, this activity may be performed on the basis of user-subscribed applications (potentially using a "self-service" plug-in module on the client computer 14 enabling a user to obtain application programs via an online service) or system-delivered applications (potentially using an administratively controlled application program delivery system).

Figure 6:
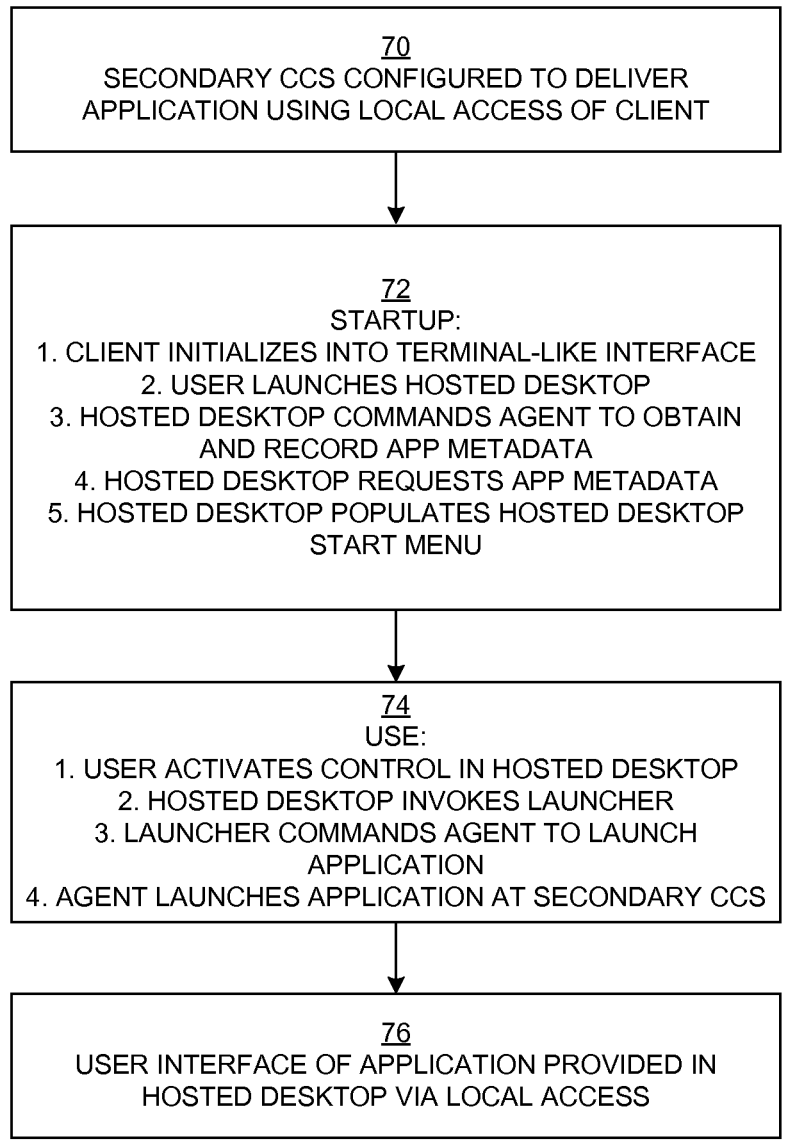

FIG. 6 is a flow chart describing the same aspect of operation as above for the case of a thin client such as described with reference to FIG. 4. In this case, the functions at 70, 74 and 76 are similar to their respective fat-client counterparts 60, 66 and 68 of FIG. 5. At 72 is the startup phase, which differs in a couple of respects from the combination of functions at 62 and 64 of FIG. 5. Specifically, at 72 the client computer 14 first initializes into its terminal-like interface represented by browser window 50, for example (FIG. 4). At this point the user may see a hypertext page provided by a web interface server, which may be a login page for example Once the user logs in, the user sees controls for application programs 32 and the hosted desktop 20 in the browser window 50. The user then launches the hosted desktop 20. As part of its startup process, the hosted desktop 20 sends one or more messages over the control channel 28 to cause the agent 30 to obtain and record the application metadata for the application programs available to the client computer 14, including the secondary-hosted application program(s) 32. In the case that a program such as Citrix Receiver is being used, the messages may include a command to launch a Receiver logon dialog on the thin client, where this logon dialog appears integrated in the hosted desktop window 46 using the local access functionality. After the logon is completed, Receiver enumerates the application programs available to the client computer 14 including the secondary-hosted application programs 32. The application metadata for the enumerated application program is stored in a data file, such as an XML or similar hypertext file, in the file system of the client computer 14. For application programs made available using a delivery service as described above, it may be necessary for Receiver to first authenticate itself to the delivery service in order to obtain information from the delivery service.

Continuing with the functions at 72, after a pre-set waiting period (e.g., 1-2 seconds), the hosted desktop 20 sends a command over the control channel 28 to retrieve the contents of the data file (e.g., XML file) in which the application metadata is stored. The retrieved contents are used to populate the start menu 56 of the hosted desktop 54. It may be desirable to include a retry or polling mechanism to accommodate a case in which the preceding enumeration takes longer than the waiting period.

Upon completion of the functions at 72 the system is ready for the use phase of 74 and 76, which as indicated above are similar to their respective counterparts 66 and 68 in the fat-client process of FIG. 5.

Figure 7:
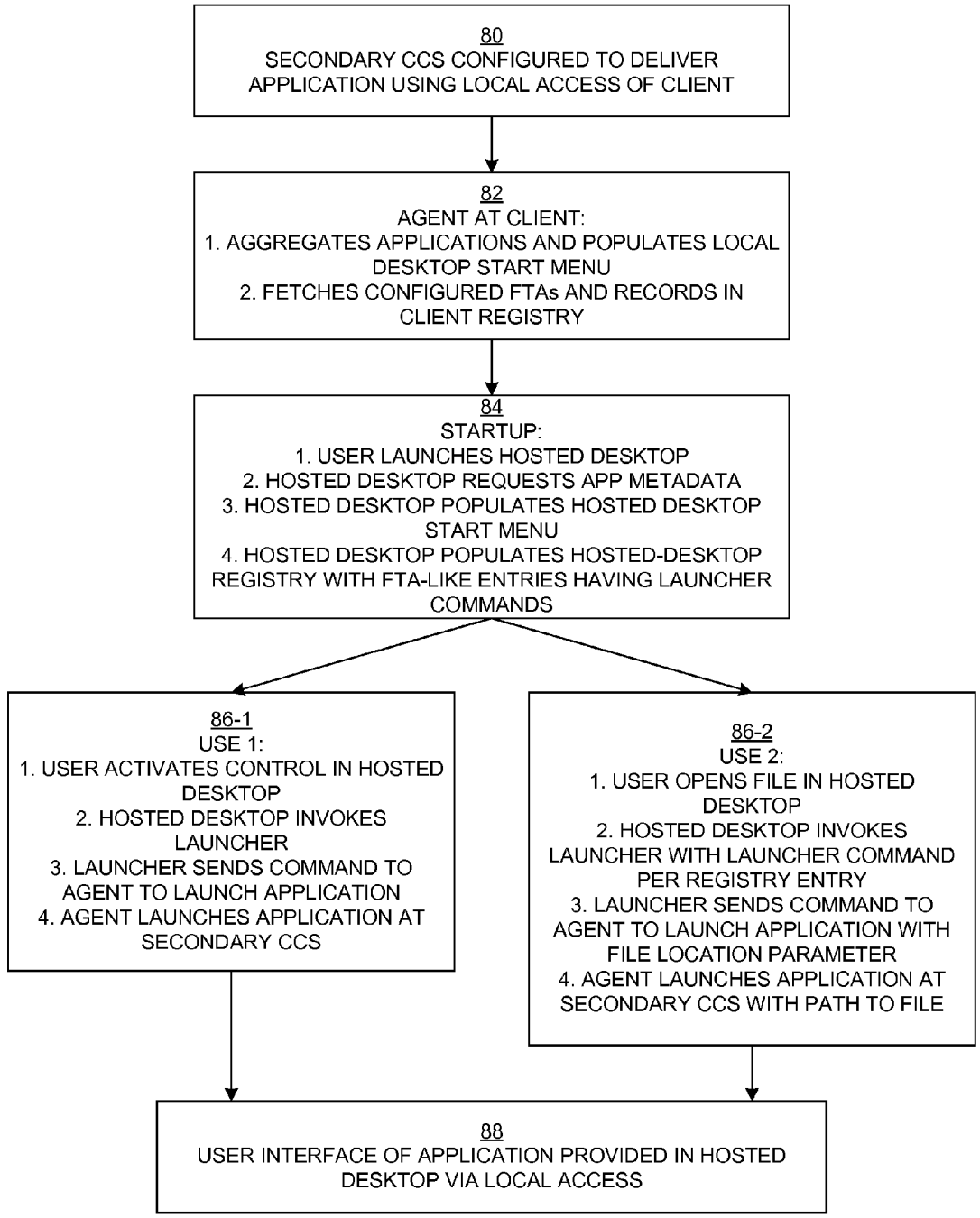
Figure 8:
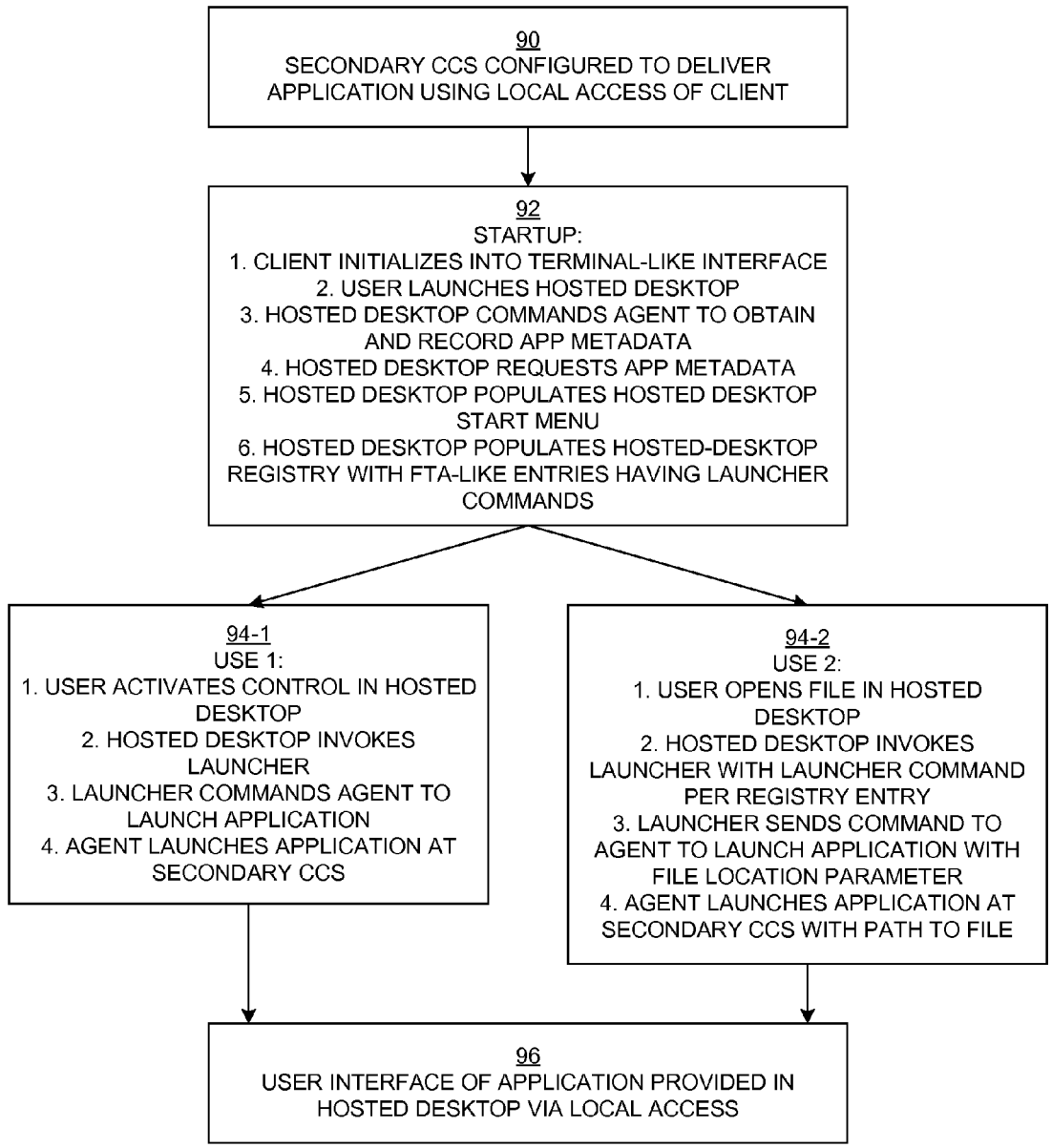

FIGS. 7 and 8 illustrate another aspect of integrating a separately provided application program (e.g., secondary-provided application program 32) into a hosted desktop 20, namely the ability to launch the separately provided application program when a data file having a file type associated with the application program is opened. Referring to the above example of AutoCad®, this application generates drawing files that have a file extension of DWG (e.g., system-.dwg). An operating system (e.g., Windows®) typically maintains an association, referred to herein as a "file type association" or FTA, between a file type as indicated by its file extension and the application program that operates on files of that type. Thus in a Windows environment, for example, an FTA may be established between the file type DWG and the application program AutoCAD®, so that when a file of that type is opened the system automatically launches AutoCAD with the name and location of the file as a parameter to enable AutoCAD to open the file immediately upon being launched. As mentioned above, this functionality becomes complicated in the heterogeneous cloud computing environment such as depicted in FIG. 1, because the application to be launched (e.g., AutoCAD) may be provided by the secondary CCS 12 while the file is located elsewhere, such as in the hosted desktop 20.

FIGS. 7 and 8 depict the function of FTA-based application launching for a fat client and thin client respectively. The differences between the two cases are similar or analogous to the differences between FIGS. 5 and 6. It should be noted that FIGS. 7 and 8 include the functionality of FIGS. 5 and 6 respectively and add in additional functions for the FTA-based application launching.

Referring to FIG. 7, the functions at 80 and 88 are similar to their counterparts at 60 and 68 respectively in FIG. 5. At 82 the agent 30 performs the same aggregation as at 62 in FIG. 5, and also fetches existing FTAs that are configured in the secondary CCS 12 and updates the registry of the client computer 14 to record which hosted application program should be used for a specific file type. It is assumed that there is such a specific file type for one or more of the secondary-hosted application programs 32, such as in the above AutoCAD example. The recording is made in the form of a command line that will be used when a file of a particular type is open. The following is an example of a command line that might be used in association with a file of type DWG (i.e., an AutoCAD file):

---

"C:\Program Files (x86)\Citrix\ICA Client\Agent.exe" /qlaunch "XenApp6 :AutoCAD" /param:"\\Client\%1"

---

The above command line includes a path on the client computer 14 to the agent 30 with an instruction "qlaunch" to perform an application launch function, with the application to be launched identified as AutoCAD on a server farm identified as XenApp6 (in this example located in the secondary CCS 12). The agent 30 is also to be invoked with a parameter identified as \\Client\% 1, which refers to a location on the client computer 14 that will be specified at call time (passed in as the value % 1). The use of this command line is described below.

At 84, the user launches the hosted desktop 20. Once the desktop is launched, as part of the startup process, the hosted desktop 20 sends a message over the control channel 28 to fetch the application metadata and uses this to populate the start menu 48 of the hosted desktop window 46 as described above with reference to step 64 of FIG. 5. As part of this exchange, the hosted desktop 20 also receives details about the file extensions (.cad, .pptx, etc.) that have been configured to be launched with the application programs for which it has obtained the application metadata. The extension information is determined by scanning the registry on the client computer 14. These details include the recorded command lines as described above. The hosted desktop 20 uses this information to create FTA-like registry entries in the registry of the hosted desktop 20. In particular, each entry associates a file type extension with a command line for invoking a "handler" routine, which in the present description corresponds to the launcher 26 (FIG. 2). An example of such a command line for a file type of DWG (AutoCAD file) is as follows:

```
"C:\Program Files (x86)\Citrix\Launcher.exe" "C:\Program
Files (x86)\Citrix\ICA Client\Agent.exe" /qlaunch
"XenApp6:AutoCAD" /param:"\\Client\%1"
```

This command line includes the above command line for the agent 30 (referred to below as an "inner" command line) preceded by a specification of the path to the launcher 26 in the primary CCS 10. It indicates that when a file of type DWG is opened, the launcher 26 is to be invoked with the inner command line for the agent 30 as an input parameter. The use and effect of this command line is described below.

FIG. 7 shows two use cases. The functions at 86-1 correspond to the use functions at 66 in the process of FIG. 5, i.e., the launching of a secondary-hosted application program 32 by activation of a control such as an item in the start menu 48 of the hosted desktop window 46.

At 86-2 are the functions for the second use case, which is initiated when the user opens a file of a given type in the hosted desktop 20. The hosted desktop 20 consults its registry and obtains the corresponding command line, then invokes the specified handler routine. Continuing with the above example, the command line causes the hosted desktop 20 to invoke the launcher 26 with the inner command line "C:\Program Files (x86)\Citrix\ICA Cnt\Agent.exe"/qlaunch "XenApp6:AutoCAD"/param:\\Client\% 1 being passed to the launcher 26 as a parameter. The hosted desktop 20 also provides the name and path of the document being opened, which will be passed as the % 1 parameter. Note that the document will generally need to be accessible to both the hosted desktop 20 as well as locally at the client computer 14.

Continuing with 86-2, the handler routine (e.g., launcher 26) sends a command over the control channel 28 to the client computer 14 to launch the agent 30 with the remaining part of the command line, e.g., "qlaunch "XenApp6:AutoCAD" /param:\\Client\doc-path", where doc-path refers to the document path provided by the hosted desktop 20 when invoking the launcher 26. The agent 30 then initiates the application launch (e.g., for AutoCAD on the secondary CCS 12) from the client computer 14 with the path to the document. From this point operation is as described above with reference to step 68 of FIG. 5.

FIG. 8 describes the thin-client counterpart of the process of FIG. 7. The functions at 90 and 96 are similar to their counterparts at 70 and 76 in FIG. 6. The startup functions 92 include the functions at 72 of FIG. 6 augmented in the same manner as described above with reference to step 84 in FIG. 7. In particular, the hosted desktop 20 also receives details about the file extensions (.cad, .pptx, etc.) that have been configured to be launched with the application programs for which it has obtained the application metadata. In this case the file extension information may be stored as part of the application metadata in the same data file (e.g., XML file) referred to in connection with step 72 of FIG. 6. The hosted desktop 20 again uses the information to create FTA-like registry entries in the registry of the hosted desktop 20, and the remaining operation (user cases at 94-1 and 94-2 can be as described above for the counterpart functions at 86-1 and 86-2 of FIG. 7.

While in the above description of FIGS. 6 and 8, the hosted desktop 20 uses two separate commands to obtain the application metadata (at both 72 and at 92), in alternative embodiments this function may require only one command from the hosted desktop 20 and a compound response by the client computer (i.e., both gathering the metadata and returning it to the hosted desktop 20 in one compound action).

While various embodiments of the invention have been particularly shown and described, it will be understood by those skilled in the art that various changes in form and details may be made therein without departing from the spirit and scope of the invention as defined by the appended claims.

What is claimed is:

1. A method of operating a cloud computing system executing a desktop hosting program providing a hosted desktop interface to a client computer, the client computer providing a terminal-like interface to the cloud computing system, comprising:

maintaining a functional connection between the desktop hosting program and a local-access function at the client computer to enable use of the hosted desktop interface by application programs locally accessed at the client computer, the application programs including a separately hosted application program executed at a separate hosting computing system to deliver an application service to the client computer, the separately hosted application program being launchable at the client computer via an application-launching control of the terminal-like interface, the application-launching control being a local control distinct from hosted-desktop controls of the hosted desktop interface;

obtaining application program metadata from the client computer, the application program metadata included in the local control and identifying the separately hosted application program to be executed at the separate hosting computing system to deliver the application service to the client computer, the application program metadata being obtained by sending a request message to the client computer and receiving a corresponding response message from the client computer via a control channel, the request message requesting data for application programs launchable via corresponding local application-launching controls of the terminal-like interface, the response message including the application-program metadata from the local control identifying the separately hosted application program;

populating the hosted desktop interface with a user-activated control including the application program metadata identifying the separately hosted application program; and upon activation of the user-activated control in the hosted desktop interface, sending a control message to the client computer via the control channel, the control message instructing the client computer to launch the separately hosted application program in functional association with the local-access function to enable user interface functions of the separately hosted application program to be provided in the hosted desktop interface, wherein the application program metadata includes one or more file type associations each identifying a corresponding file type as being opened by the separately hosted application program, and further comprising:

maintaining a handler launch record for each file type association, the handler launch record including a handler launch command usable to invoke a handler routine executed by the cloud computing system, the handler launch command including an agent launch command usable to invoke an agent routine executed by the client computer, the agent launch command including an application launch command usable at the client computer to invoke the separately hosted application program; and upon a file being opened in the hosted desktop interface having a file type of one of the file type associations:

(1) based on the handler launch record, executing the handler launch command to invoke the handler routine with the agent launch command and a file location parameter identifying a storage location of the file; and (2) under control of the handler routine, sending the agent launch command with the file location parameter to an application-launching agent executing on the client computer, the application-launching agent being operative to use the application launch command to launch the separately hosted application program with the file location parameter to cause the separately hosted application program to open the file.

2. A method according to claim 1, wherein the cloud computing system is a primary cloud computing system, and wherein the separate hosting computing system is a secondary cloud computing system.

3. A method according to claim 1, wherein the local control is a shortcut.

4. A method according to claim 1, wherein:

the request message is a second request message preceded by a first request message sent to the client computer via the control channel, the first request message instructing the client computer to enumerate application programs from secondary clouds that are executable by the client computer in an application program data file stored at the client computer, the second request message requesting contents of the application program data file; and the response message includes the application program metadata from the local control obtained from the application program data file.

5. A method according to claim 1, wherein:

maintaining the handler launch record includes (1) constructing the handler launch record based on the application program metadata as obtained from the response message, and (2) populating a registry of the hosted desktop interface with a registry entry, the registry entry being associated with a corresponding file type and including the handler launch record as constructed; and executing the handler launch command based on the handler launch record includes retrieving the handler launch record from the registry based on the file type of the file being opened.

6. A method according to claim 1, wherein:

the request message requests contents of an application program data file; and the application program metadata provided in the response message is data for the local control obtained from the application program data file.

7. A method of operating a client computer as a client of a cloud computing system executing a desktop hosting program providing a hosted desktop interface to the client computer, comprising:

providing a terminal-like interface to the cloud computing system;

maintaining a functional connection between the desktop hosting program and a local-access function at the client computer to enable use of the hosted desktop interface by application programs locally accessed at the client computer, the application programs including a separately hosted application program executed at a separate hosting computing system to deliver an application service to the client computer, the separately hosted application program being launchable at the client computer via an application-launching control of the terminal-like interface, the application-launching control being a local control distinct from hosted-desktop controls of the hosted desktop interface;

providing application program metadata from the client computer to the cloud computing system, the application program metadata included in the local control and identifying the separately hosted application program to be executed at the separate hosting computing system to deliver the application service to the client computer, the application program metadata being used by the cloud computing system to populate the hosted desktop interface with a user-activated control including the application program metadata, the application program metadata being provided by receiving a request message from the cloud computing system and sending a corresponding response message to the cloud computing system via a control channel, the request message requesting data for application programs launchable via corresponding local application-launching controls of the terminal-like interface, the response message including the application-program metadata from the local control identifying the separately hosted application program; and upon activation of the user-activated control in the hosted desktop interface, (1) receiving a control message from the cloud computing system via a the control channel, the control message instructing the client computer to launch the separately hosted application program, and (2) in response to receiving the control message, launching the separately hosted application program in functional association with the local-access function to enable user interface functions of the separately hosted application program to be provided in the hosted desktop interface, wherein:

the application program metadata includes one or more file type associations each identifying a corresponding file type as being opened by the separately hosted application program;

the cloud computing system maintains a handler launch record for each file type association, the handler launch record including a handler launch command usable to invoke a handler routine executed by the cloud computing system, the handler launch command including an agent launch command usable to invoke an agent routine executed by the client computer, the agent launch command including an application launch command usable at the client computer to invoke the separately hosted application program; and the cloud computing system is operative, upon a file being opened in the hosted desktop interface having a file type of one of the file type associations, and based on the handler launch record, to (1) execute the handler launch command to invoke the handler routine with the agent launch command and a file location parameter identifying a storage location of the file, and (2) under control of the handler routine, send the agent launch command with the file location parameter to an application-launching agent executing on the client computer, and further including, by the application-launching agent of the client computer, using the application launch command to launch the separately hosted application program with the file location parameter to cause the separately hosted application program to open the file.

8. A method according to claim 7, wherein the local control is a shortcut.

9. A method according to claim 7, wherein:

the request message is a second request message preceded by a first request message sent to the client computer via the control channel, the first request message instructing the client computer to enumerate application programs from secondary clouds that are executable by the client computer in an application program data file stored at the client computer, the second request message requesting contents of the application program data file; and the response message includes the application program metadata from the local control obtained from the application program data file.

10. A cloud computing system, comprising:

input/output circuitry operative to provide a communications interface to client computer, the client computer providing a terminal-like interface to the cloud computing system;

memory storing a set of computer program instructions of a desktop hosting program; and processing circuitry operative to execute the desktop hosting program to provide a hosted desktop interface to the client computer, the execution of the desktop hosting program by the processing circuitry causing the cloud computing system to perform a method including:

maintaining a functional connection between the desktop hosting program and a local-access function at the client computer to enable use of the hosted desktop interface by application programs locally accessed at the client computer, the application programs including a separately hosted application program executed at a separate hosting computing system to deliver an application service to the client computer, the separately hosted application program being launchable at the client computer via an application-launching control of the terminal-like interface, the application-launching control being a local control distinct from hosted-desktop controls of the hosted desktop interface;

obtaining application program metadata from the client computer, the application program metadata included in the local control and identifying the separately hosted application program to be executed at the separate hosting computing system to deliver the application service to the client computer, the application program metadata being obtained by sending a request message to the client computer and receiving a corresponding response message from the client computer via a control channel, the request message requesting data for application programs launchable via corresponding local application-launching controls of the terminal-like interface, the response message including the application-program metadata from the local control identifying the separately hosted application program;

populating the hosted desktop interface with a user-activated control including the application program metadata identifying the separately hosted application program; and upon activation of the user-activated control in the hosted desktop interface, sending a control message to the client computer via the control channel, the control message instructing the client computer to launch the separately hosted application program in functional association with the local-access function to enable user interface functions of the separately hosted application program to be provided in the hosted desktop interface, wherein the application program metadata includes one or more file type associations each identifying a corresponding file type as being opened by the separately hosted application program, and wherein the method further includes:

maintaining a handler launch record for each file type association, the handler launch record including a handler launch command usable to invoke a handler routine executed by the cloud computing system, the handler launch command including an agent launch command usable to invoke an agent routine executed by the client computer, the agent launch command including an application launch command usable at the client computer to invoke the separately hosted application program; and upon a file being opened in the hosted desktop interface having a file type of one of the file type associations:

(1) based on the handler launch record, executing the handler launch command to invoke the handler routine with the agent launch command and a file location parameter identifying a storage location of the file; and (2) under control of the handler routine, sending the agent launch command with the file location parameter to an application-launching agent executing on the client computer, the application-launching agent being operative to use the application launch command to launch the separately hosted application program with the file location parameter to cause the separately hosted application program to open the file.

11. A client computer, comprising:

input/output circuitry operative to provide a communications interface to a cloud computing system and to a separate hosting computing system;

memory storing a set of computer program instructions of a user interface program; and processing circuitry operative to execute the user interface program to obtain a hosted desktop interface from the cloud computing system, the execution of the user interface program by the processing circuitry causing the client computer to perform a method including:

providing a terminal-like interface to the cloud computing system;

maintaining a functional connection between the desktop hosting program and a local-access function at the client computer to enable use of the hosted desktop interface by application programs locally accessed at the client computer, the application programs including a separately hosted application program executed at a separate hosting computing system to deliver an application service to the client computer, the separately hosted application program being launchable at the client computer via an application-launching control of the terminal-like interface, the application-launching control being a local control distinct from hosted-desktop controls of the hosted desktop interface;

providing application program metadata from the client computer to the cloud computing system, the application program metadata included in the local control and identifying the separately hosted application program to be executed at the separate hosting computing system to deliver the application service to the client computer, the application program metadata being used by the cloud computing system to populate the hosted desktop interface with a user-activated control including the application program metadata, the application program metadata being provided by receiving a request message from the cloud computing system and sending a corresponding response message to the cloud computing system via a control channel, the request message requesting data for application programs launchable via corresponding local application-launching controls of the terminal-like interface, the response message including the application-program metadata from the local control identifying the separately hosted application program; and upon activation of the user-activated control in the hosted desktop interface, (1) receiving a control message from the cloud computing system via the control channel, the control message instructing the client computer to launch the separately hosted application program, and (2) in response to receiving the control message, launching the separately hosted application program in functional association with the local-access function to enable user interface functions of the separately hosted application program to be provided in the hosted desktop interlace, wherein:

the application program metadata includes one or more file type associations each identifying a corresponding file type as being opened by the separately hosted application program;

the cloud computing system maintains a handler launch record for each file type association, the handler launch record including a handler launch command usable to invoke a handler routine executed by the cloud computing system, the handler launch command including an agent launch command usable to invoke an agent routine executed by the client computer, the agent launch command including an application launch command usable at the client computer to invoke the separately hosted application program; and the cloud computing system is operative, upon a file being opened in the hosted desktop interface having a file type of one of the file type associations, and based on the handler launch record, to (1) execute the handler launch command to invoke the handler routine with the agent launch command and a file location parameter identifying a storage location of the file, and (2) under control of the handler routine, send the agent launch command with the file location parameter to an application-launching agent executing on the client computer, and wherein the method further includes, by the application-launching agent of the client computer, using the application launch command to launch the separately hosted application program with the file location parameter to cause the separately hosted application program to open the file.

12. A method according to claim 1, wherein the hosted desktop interface is provided via a hosted desktop window included in a terminal-interface hypertext page of the terminal-like interface at the client computer.

13. A method according to claim 4, wherein the application program data file is a markup-language file stored in a file system of the client computer.

14. A method according to claim 7, wherein the hosted desktop interface is provided via a hosted desktop window included in a terminal-interface hypertext page of the terminal-like interface at the client computer, and wherein the client computer initializes into the terminal-like interface and terminal-interface hypertext page.

* * * * *

UNITED STATES PATENT AND TRADEMARK OFFICE
CERTIFICATE OF CORRECTION

| | |
|---|---|
| PATENT NO. | : 9,256,447 B2 |
| APPLICATION NO. | : 13/588152 |
| DATED | : February 9, 2016 |
| INVENTOR(S) | : Ashish Gujarathi and Michael East |

It is certified that error appears in the above-identified patent and that said Letters Patent is hereby corrected as shown below:

Claims:

Claim 7, Column 12, Line 54, "the cloud computing system via a the control channel," should read -- the cloud computing system via the control channel, --.

Signed and Sealed this
Nineteenth Day of July, 2016

Michelle K. Lee
*Director of the United States Patent and Trademark Office*